UNITED STATES PATENT OFFICE.

FREDERICK LAIST AND JAMES ORR ELTON, OF ANACONDA, MONTANA, ASSIGNORS TO ANACONDA COPPER MINING COMPANY, OF ANACONDA, MONTANA, A CORPORATION OF MONTANA.

PROCESS OF RECOVERING ZINC FROM ORES.

1,255,436. Specification of Letters Patent. Patented Feb. 5, 1918.

No Drawing. Application filed June 16, 1916. Serial No. 104,084.

*To all whom it may concern:*

Be it known that we, FREDERICK LAIST and JAMES ORR ELTON, citizens of the United States, residing at Anaconda, in the county of Deerlodge and State of Montana, have invented certain new and useful Improvements in Processes of Recovering Zinc from Ores, of which the following is a specification.

It is well known that zinc-bearing solutions, such as are derived for instance from roasted sulfid ores of zinc by treatment thereof with dilute sulfuric or other acid, carry arsenic and antimony in proportion to interfere materially with the electrodeposition of zinc; and it has been pointed out (compare U. S. Patents 1,167,700 and 1,167,701 to Laist and Frick) that the presence of iron in the ferric state in such solutions is essential to the effective removal of these impurities. In presence of ferric iron a simple treatment with such basic reagents as zinc oxid, lime, etc., will suffice not only to eliminate the iron, but to precipitate therewith a part at least of the arsenic and antimony, probably in the form of ferric arsenate and antimonate.

In the practice of this method it has been found that in order to insure the substantially complete elimination of arsenic and antimony from such solutions, the ferric iron must be present therein in material excess of the proportion theoretically required for formation of the corresponding arsenates and antimonates, and in fact in larger proportion than is usually derived from a properly calcined ore under the usual leaching conditions. On the other hand the presence of iron in solution seriously interferes with the proper recovery of zinc in the electrolytic cells.

According to the present invention this difficulty is avoided by means of a cyclical operation wherein iron salts are introduced into the solution at a stage following the electrolysis, and are removed therefrom, together with the arsenic and antimony, at a stage preceding the next electrolysis. In this way the presence of sufficient iron is insured during the purifying stage, while the electrolysis is carried out with practically iron-free electrolytes.

In this process the zinc is deposited as metal in cells having insoluble anodes, whereby an exhausted or impoverished electrolyte containing free sulfuric or other acid is obtained, and is used for leaching fresh batches of ore. According to one embodiment of our invention this acid solution is permitted to flow, on its return from the electrolytic cells to the ore leaching tanks, over scrap iron or a soluble iron ore, whereby its iron content is brought to the proportion necessary for substantially complete removal of any arsenic and antimony which may pass into solution in the leaching operation, or if desired a solution of an iron salt may be added directly to the acid solution flowing into the leaching system. During or after the leaching this iron must be brought completely into the ferric state by means of any suitable oxidizing agent, of which manganese dioxid is one of the most effective. The iron is then completely precipitated, preferably by zinc oxid or fine calcines, and the solution after further purification if required returns to the electrolytic cells, thereby completing the cycle.

Although a system of this kind is effective for the removal of arsenic and antimony, difficulty is sometimes experienced, owing to slow solution of metallic iron or iron ore in such dilute acid solutions as are used for leaching roasted zinc ores; and owing also to slow oxidation of the iron after it has been dissolved. It will be understood in this connection that unless all of the iron is in the ferric state, its complete removal is very difficult. We have found, however, that all of the above difficulties may be overcome by the following modification of the above described process.

Scrap iron or iron ore is treated with an excess of sulfuric acid of sufficient concentration (say 20%) to react rapidly therewith, the action being preferably continued until the solution contains 5% or more of iron. Manganese dioxid, or an ore or other material containing manganese in a state of oxidation higher than the manganous state is then added to the hot acid solution, whereupon all of the iron is quickly brought to the ferric state. The resulting ferric solution, containing also manganous salts, is then added to each leach to furnish sufficient iron for the removal of arsenic and antimony as arsenate and antimonate. After the removal of the ferric iron the manganous salts may be reoxidized in the electrolytic operation, and are thus available for reuse in a repetition of the process.

We claim:

1. A cyclical process of recovering zinc from ores thereof containing arsenic or antimony, consisting in alternately leaching the ore with an acid solvent for zinc, and electrolytically precipitating zinc from the resulting solution, introducing iron into the solution subsequent to the electrolysis from an outside source and in proportion sufficient for the substantial elimination of arsenic and antimony, and removing the iron therefrom, together with the arsenic and antimony, by precipitation in the ferric state prior to the succeeding electrolysis.

2. A cyclical process of recovering zinc from ores thereof containing arsenic or antimony, consisting in alternately leaching the ore with an acid solvent for zinc, and electrolytically precipitating zinc from the resulting solution, introducing a ferric salt into the solution subsequent to the electrolysis and in proportion sufficient for the substantial elimination of arsenic and antimony, and removing the iron from the solution, together with the arsenic and antimony, by precipitation prior to the succeeding electrolysis.

3. In a process of recovering zinc from ores thereof containing arsenic or antimony, the steps which consist in preparing a solution containing a ferric salt, and introducing the same into the leach in proportion sufficient for the substantially complete elimination of arsenic and antimony.

4. In a process of recovering zinc from ores thereof containing arsenic or antimony, the steps which consist in preparing an acid solution containing a ferrous salt, oxidizing the same by means of a compound containing manganese in a state of oxidation higher than the manganous state, and introducing the resulting solution containing ferric and manganous compounds into the leach in proportion sufficient for the substantially complete elimination of arsenic and antimony.

5. In a process of recovering zinc from ores thereof containing arsenic or antimony, the step which consists in introducing into the leach a solution containing ferric and manganous salts.

In testimony whereof, we affix our signatures.

FREDERICK LAIST.
JAMES ORR ELTON.